United States Patent [19]

Atick et al.

[11] Patent Number: 6,111,517

[45] Date of Patent: Aug. 29, 2000

[54] CONTINUOUS VIDEO MONITORING USING FACE RECOGNITION FOR ACCESS CONTROL

[75] Inventors: Joseph J. Atick; Paul A. Griffin, both of New York, N.Y.; A. Norman Redlich, Metuchen, N.J.

[73] Assignee: Visionics Corporation, Jersey City, N.J.

[21] Appl. No.: 08/774,556

[22] Filed: Dec. 30, 1996

[51] Int. Cl.[7] .................................................. G07D 7/00
[52] U.S. Cl. ................................. 340/825.34; 382/118
[58] Field of Search .......................... 340/825.34, 825.31; 382/115, 118, 203, 276; 348/156, 14; 902/3; 704/273, 1

[56] References Cited

U.S. PATENT DOCUMENTS

| | | | |
|---|---|---|---|
| 4,449,189 | 5/1984 | Feix et al. ............................ | 382/118 X |
| 4,712,103 | 12/1987 | Gotanda ............................. | 340/835.31 |
| 4,858,000 | 8/1989 | Lu . | |
| 4,975,969 | 12/1990 | Tal .................................... | 340/825.34 X |
| 4,993,068 | 2/1991 | Piosenka et al. .............. | 340/825.34 X |
| 5,031,228 | 7/1991 | Lu . | |
| 5,164,992 | 11/1992 | Turk et al. . | |
| 5,189,691 | 2/1993 | Dunlap ............................... | 348/14 X |
| 5,229,764 | 7/1993 | Matchett et al. .................. | 340/825.34 |
| 5,331,544 | 7/1994 | Lu et al. . | |
| 5,386,103 | 1/1995 | DeBan et al. ....................... | 235/379 |
| 5,432,864 | 7/1995 | Lu et al. ............................. | 382/118 |
| 5,561,718 | 10/1996 | Trew et al. ......................... | 382/118 |
| 5,771,307 | 6/1998 | Lu et al. . | |
| 5,835,616 | 11/1998 | Lobo et al. . | |
| 5,991,429 | 11/1999 | Coffin et al. . | |
| 6,009,210 | 12/1999 | Kang . | |

FOREIGN PATENT DOCUMENTS

WO 93/11511  6/1993  WIPO .

OTHER PUBLICATIONS

"FERET (Face Recognition Technology) Recognition Algorithm Development and Test Results;" P. Jonathon Phillips, Patrick J, Rauss, abd Sandor Z. Der; Army Research Laboratory, Report No. ARL-TR-995, 72 pages, Oct. 1996.

*Primary Examiner*—Edwin C. Holloway, III
*Attorney, Agent, or Firm*—Pennie & Edmonds LLP

[57] ABSTRACT

A continuous monitoring system for regulating access to a computer system or other restricted environment is disclosed. The system employs real-time face recognition to initially detect the presence of an authorized individual and to grant the individual access to the computer system. In some embodiments, the system also employs real-time face recognition to continuously or periodically track the continued presence of the authorized individual. Access to the computer system is revoked when the individual's presence is no longer detected. In other embodiments, the system employs a screen saver program to deny access to the computer system when a predetermined period of user inactivity is detected. Other aspects of the invention include a stranger detector which warns the authorized individual of the approach of an unauthorized individual, a multimedia messaging center which permits unauthorized individuals to leave messages for authorized individuals, and an adaptive enrollment program which permits the system to update the stored video images of authorized individuals to reflect the individuals' current appearance.

48 Claims, 11 Drawing Sheets

Microfiche Appendix Included
(22 Microfiche, 2070 Pages)

CONTINUOUS VIDEO MONITORING USING FACE RECOGNITION FOR ACCESS CONTROL

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to a system employing real-time face recognition software to regulate and monitor access to computers and other restricted environments.

BACKGROUND OF THE INVENTION

Many computer systems permit access only to authorized users. This is generally accomplished by requiring those seeking to use the system to prove that they are authorized to do so. Proof of authorization can take many forms. Often, the user must provide a name or initials and a password or Personal Identification Number (PIN) before being permitted to use the system. Other systems require the user to insert a magnetic card or similar "key" into a reader which verifies that the cardholder is authorized to use the system. Still others evaluate some biometric characteristic of the user, such as the user's voice print.

All such access control systems, however, suffer from several drawbacks. The most important is that they merely restrict initial access to the computer system. Once a user has gained access, continued use of the system is possible by someone else when the authorized user leaves the computer system unattended. This decreases the security of the system for several reasons. If the user leaves the computer unattended, an unauthorized user may gain access to sensitive data stored in the computer system. Moreover, the unauthorized user might also be in a position to modify or even erase data stored in the computer system.

To avoid this possibility, wary authorized users may choose to exit the system even when stepping away from the computer for only a short time. This, too, has a drawback: the authorized user must reenter the computer system when he returns, a process which may take several minutes. Furthermore, this tactic does not permit continued running of application programs such as spreadsheets while the user is away. As a result, users may end up "standing guard" at their computers when running sensitive spreadsheets and other programs.

Second, presently available access control systems do not offer convenient hands-off or passive operation, since they require the active participation of the user before entry is granted. Therefore, in addition to the inconvenience of remembering a password or of carrying a magnetic card, users suffer the additional inconvenience of typing the password into a keyboard or swiping the magnetic card, before access is granted.

Furthermore, security systems that use passwords or cards can be compromised since a password can be discovered by an intruder and cards can be stolen.

A need therefore exists in the art for a security system without the above drawbacks. In particular, there is a need for a convenient passive security system which continuously monitors the identity of an authorized user and prevents access to a computer system without shutting the computer system down when it is determined that the authorized user has left the computer unattended.

In addition, the need for a continuous monitoring system exists not only with respect to virtual environments such as a computer system, but more generally extends to other restricted environments, including physical environments such as bank vaults.

OBJECTS AND SUMMARY OF THE INVENTION

It is therefore an object of the present invention to provide a security system which continuously monitors the identity of an authorized individual and prevents access to a computer system or other restricted environment when it is determined that the authorized individual has left the vicinity of the environment.

It is a further object of the present invention to continuously verify the identity of an authorized user in real time.

It is a further object of the present invention to perform the continuous monitoring in a manner which is passive, i.e., in a manner which does not require the participation of the user.

It is a further object of the present invention to assign an authorization level to each authorized individual and to permit each authorized individual access only to those application programs and data appropriate for the user's authorization level.

It is a further object of the present invention to provide a security system which continuously monitors whether a second person other than the authorized user has approached within reading distance of a display of the computer system and which, upon detection of this circumstance, disables the display or alerts the authorized user of the second person's presence.

It is a further object of the present invention to provide a continuous monitoring system which employs face recognition to passively regulate both initial and continuing access to a computer system.

It is a further object of the present invention to fuse face recognition and speech recognition to provide swift initial access to a computer system.

It is a further object of the present invention to employ the screen saver utility resident in most operating systems to revoke access to a computer system when a significant period of user inactivity is detected.

It is a further object of the present invention to employ the screen saver utility resident in most operating systems to launch a face recognition program which revokes access to a computer system when it fails to identify the continued presence of an authorized individual.

It is a further object of the present invention to employ the screen saver utility resident in most operating systems to launch a motion detection program which revokes access to the computer system when it fails to detect motion in the vicinity of the computer system.

It is a further object of the present invention to provide a video monitoring system which detects the presence of an unauthorized person, and upon detection of this circumstance, displays a greeting to that person and permits the person to leave a message for an authorized person.

These and other objects of the invention are accomplished by a system comprising a video input device coupled to a general purpose computer or other specialized hardware furnished with a face-recognition software program. The face recognition algorithm is capable of identifying faces in real time. The system repeatedly compares the face registered by the video input device with the facial representations of authorized individuals. When the comparison fails to indicate a match, continued access to the computer system is denied.

BRIEF DESCRIPTION OF THE DRAWINGS

The above objects and summary of the invention will be better understood when taken in conjunction with the following detailed description and accompanying drawings in which.

DETAILED DESCRIPTION OF THE PREFERRED EMBODIMENTS

Figure 1:
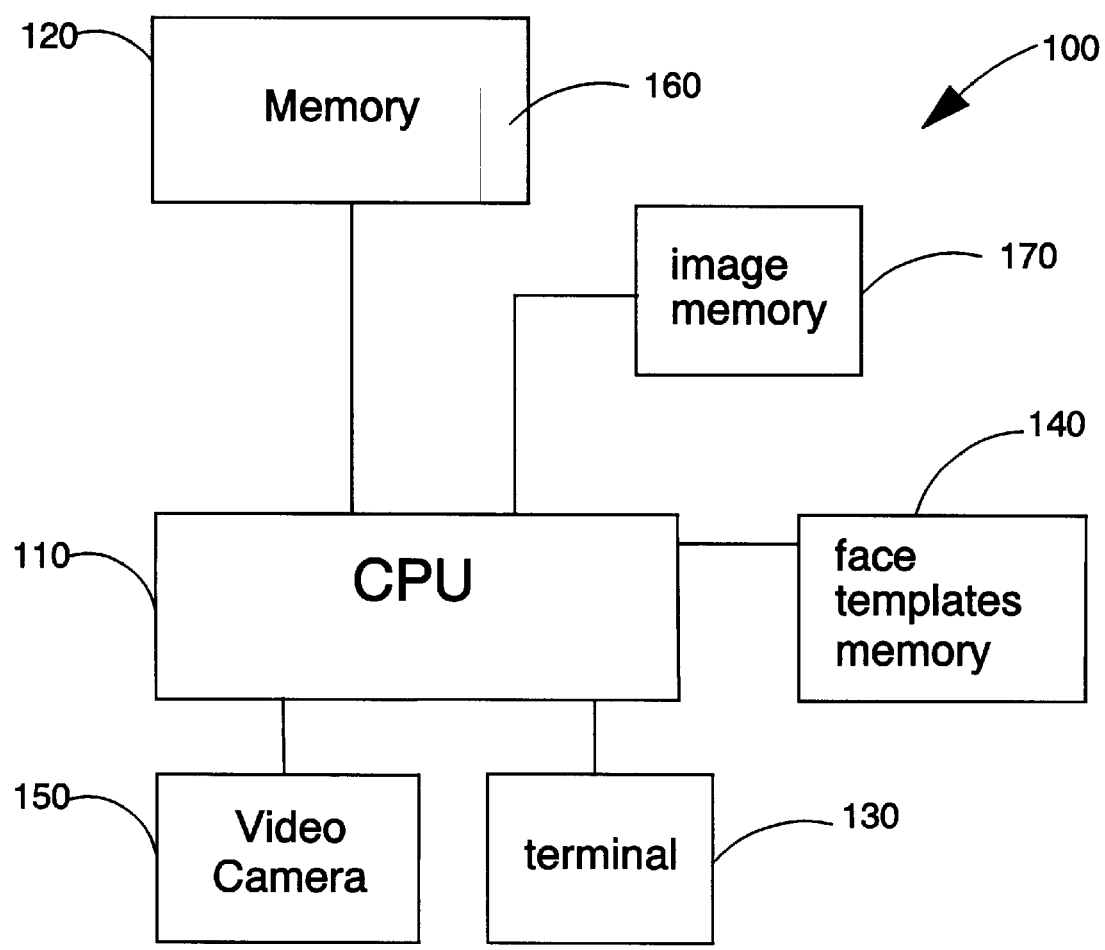
FIG. 1 is a block diagram of a preferred computer system architecture implementing the continuous monitoring system of the present invention.

Referring to the drawings, FIG. 1 shows a computer system 100 which comprises a CPU 110, a memory 120, and input/output (I/O) means such as terminal 130. Memory 120 stores application programs run on CPU 110 as well as other data and information.

Computer system 100 also comprises an image memory 170, a face templates memory 140 and a video input device such as video camera 150. As described more fully below, image memory 170 stores one or more facial images of each individual authorized to have access to computer system 100. When computer system 100 is initialized, the stored images of each authorized individual are converted to a facial representation or template. These templates are stored in face templates memory 140. If desired, image memory 170 and face templates memory 140 may be implemented as part of memory 120. Memory 120 also stores a real-time face recognition software program 160.

In a preferred embodiment, the video camera 150 is positioned such that a user sitting in front of terminal 130 would be in the field of view of video camera 150. As explained in more detail below, program 160 enables computer system 100 to match facial images transmitted by video camera 150 against facial representations stored in face templates memory 140 and to ascertain whether persons in the field of view of video camera 150 are authorized to have access to computer system 100.

Figure 2:
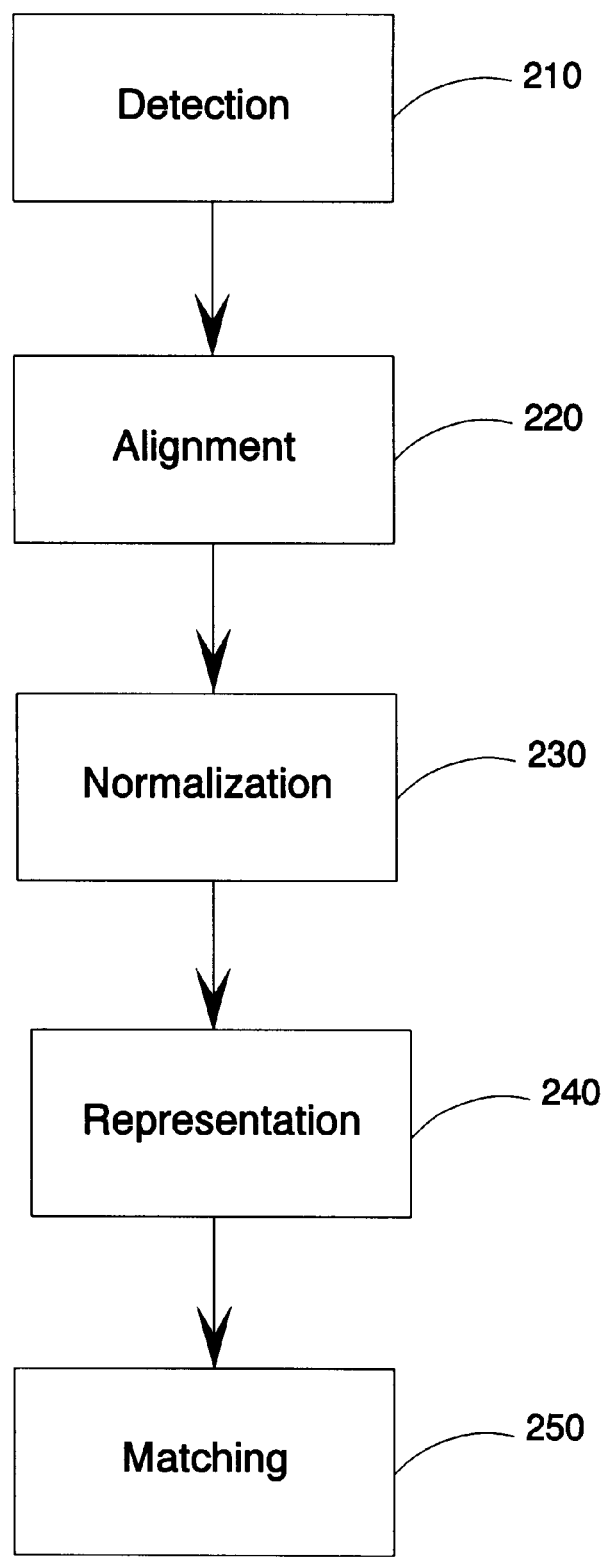
FIG. 2 is a high level flowchart depicting the steps in face recognition.

Before describing the function of the continuous monitoring system of the present invention, a short review of the principal steps in face recognition would be useful. As shown in FIG. 2, face recognition can be broken down into a sequence of discrete tasks. In detection step 210, the face recognition system searches the field of view of a video input device for faces.

In a real-time system—such as the system of the present invention—face detection must be accomplished in a fraction of a second. This is a challenge since the search area consists of the entire field of view of video camera 150 which is often as large as 640 by 480 pixels. Current algorithms meet this challenge and accomplish real-time detection by employing either a multiscale search strategy, a multicue search strategy, or both, which permits the entire field of view to be searched at a considerably higher speed than would otherwise be possible.

Multiscale search algorithms initially search for faces in low resolution and switch to high resolution only when the low resolution search indicates a head-like shape. Multicue search algorithms on the other hand, initially search for easily detected cues which indicate the presence of a face. For example, the presence of a face in the field of view often generates discontinuities in the spatial, temporal, and color domains of the video image. Multicue algorithms search for such discontinuities and further examine only those areas where the discontinuities are significant. Software programs for performing real-time face detection using a multiscale and multicue search strategy are commercially available. One such program is the C++ function CHead::FindHeadPosition of the FaceIt Developer Kit. A copy of the object code and a description of the Application Programming Interface (API) for this function is found in microfiche appendix A hereto. A person skilled in the art can use CHead to perform face detection from video input as specified by the API.

Once a face has been detected, the face recognition system performs alignment step 220 to precisely determine the head's position, size, and pose. This step requires detailed shape and feature detection. Software programs for performing alignment step 220 are also commercially available. One such program is the function CAlignment::FindAlignedPosition of the FaceIt Developer Kit. A copy of the object code of this program is also found in microfiche appendix A hereto.

Next, the face recognition system performs normalization step 230. Here, the head is normalized by scaling, rotating, and warping, so that the face can be registered and mapped into a canonical size and pose regardless of its location and distance from video camera 150. Normalization is also performed with respect to lighting variability. Normalization step 230, too, can be performed using commercially available software programs such as CFace::GetCanonicalImage function of the FaceIt Developer Kit. A copy of the object code of this program is also found in microfiche appendix A hereto.

The fourth step is representation step 240. Every face recognition system utilizes an internal representation scheme which it employs to translate facial data into a unique coded characterization of the face of each individual. The representation scheme permits relatively simple comparison of acquired facial data with stored facial data to confirm the identity of a particular individual. A preferred embodiment for converting the images stored in image memory 170 into templates suitable for performing face recognition is the function CFace::LoadFace of the FaceIt Developer Kit. A copy of the object code of this function may be found in microfiche Appendix A of this application. In this preferred embodiment, when computer system 100 boots up, it retrieves the images of all authorized users from image memory 170 and converts them to face templates. The system then stores these templates in face templates memory 140 where they remain until computer system 100 is shut down.

The fifth step is matching step 250. In this step the acquired facial representation is compared to at least one stored facial representation and a score is computed which represents the degree to which the acquired representation matches the stored representation. If the score is above a predetermined threshold, a match is declared, and the face in the field of view is identified as belonging to the person associated with the stored facial representation. Software programs that generate a representation for faces, step 240, and for performing matching step 250 on that representation are commercially available. One such program is the function CFace::IdentifyPerson of the FaceIt Developer Kit. A copy of the object code of this program is also found in microfiche appendix A hereto.

Of course, before a face recognition system can be used, authorized users must be enrolled into the database. A preferred embodiment of an enrollment program that is used by the present invention to store the facial images of authorized individuals into image memory 170 is described below in connection with FIGS. 9 and 10.

Figure 3A:
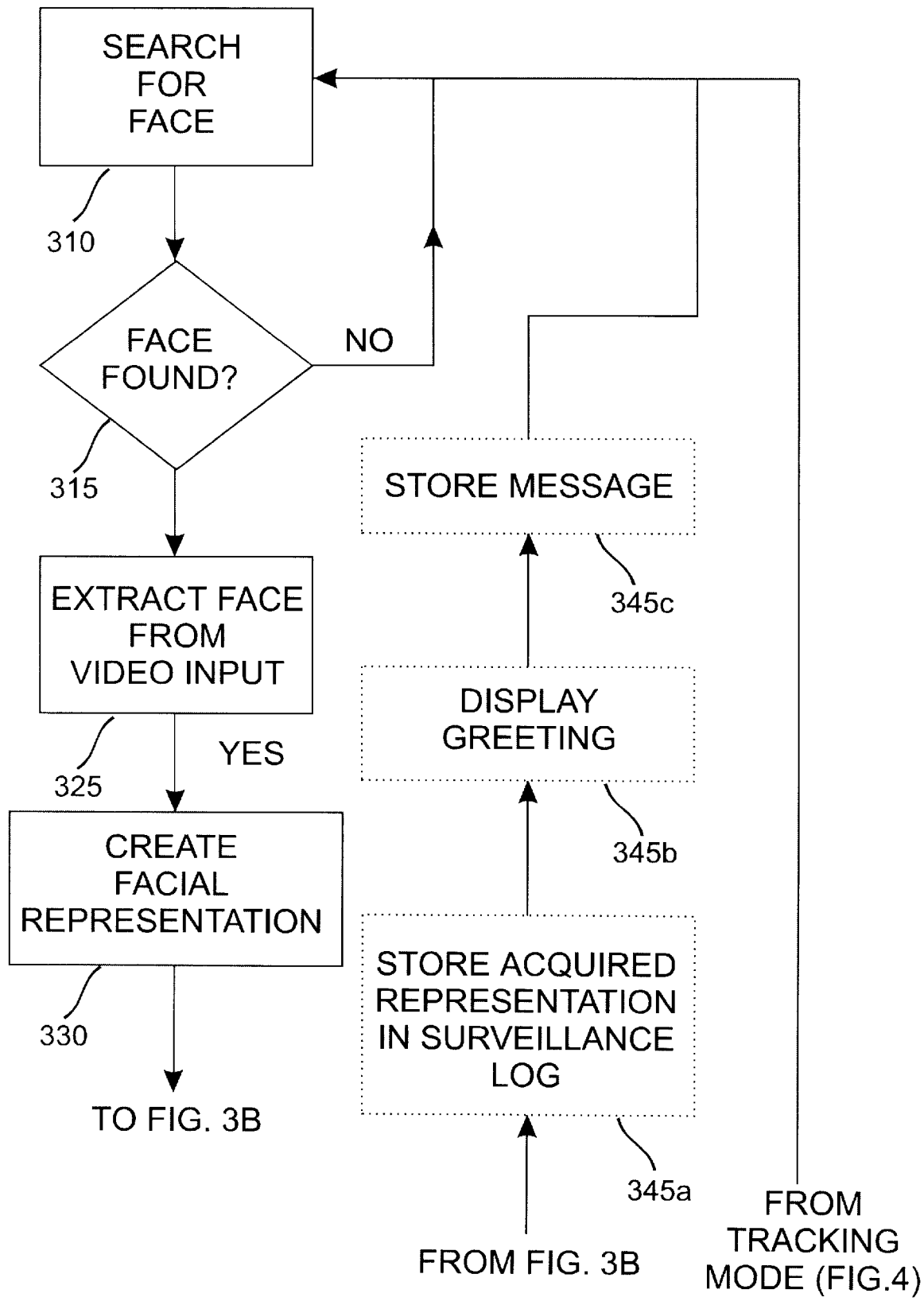
FIG. 3 is a flowchart depicting the not-tracking mode of the continuous monitoring system of the present invention.
Figure 3B:
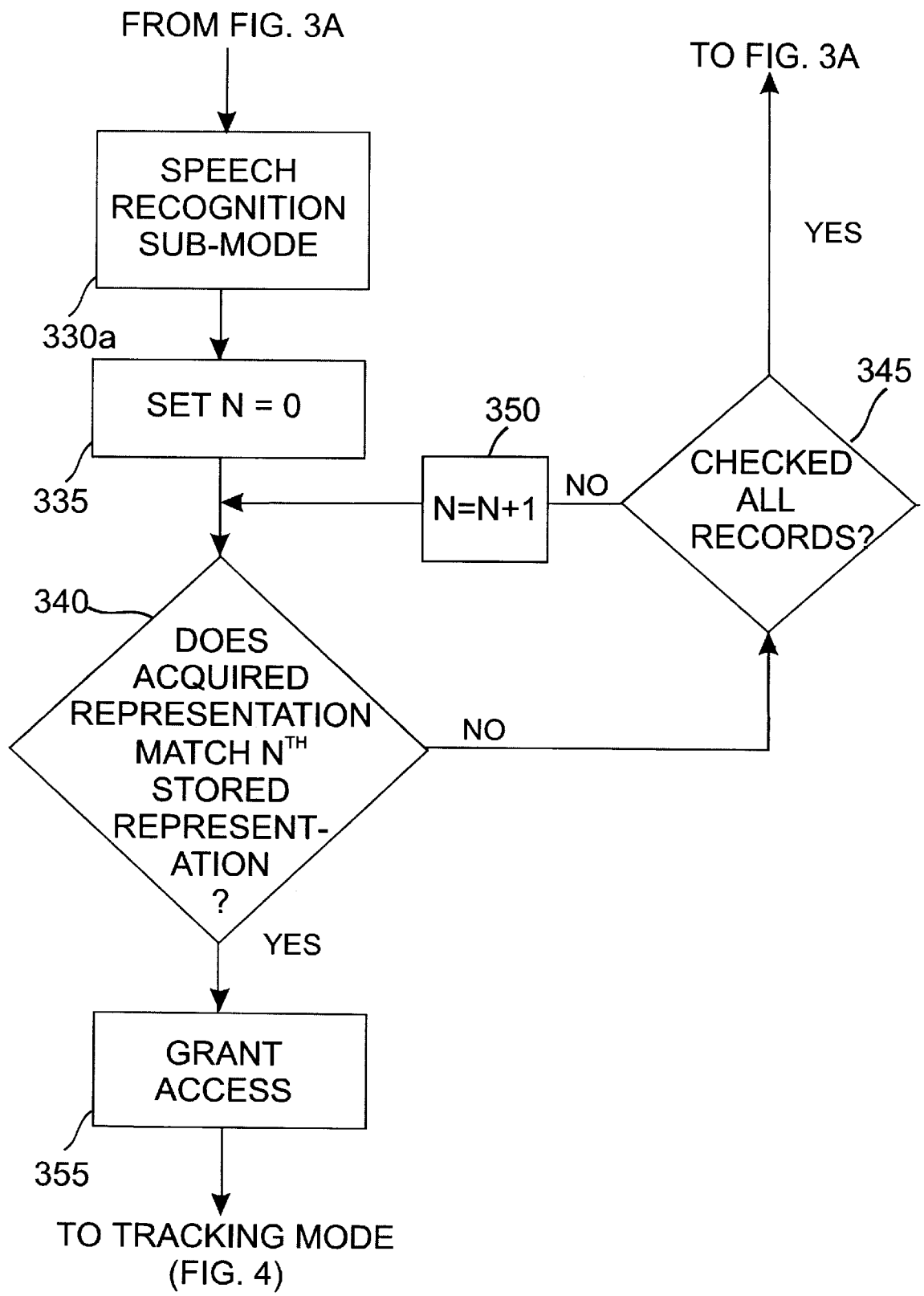
Figure 4:
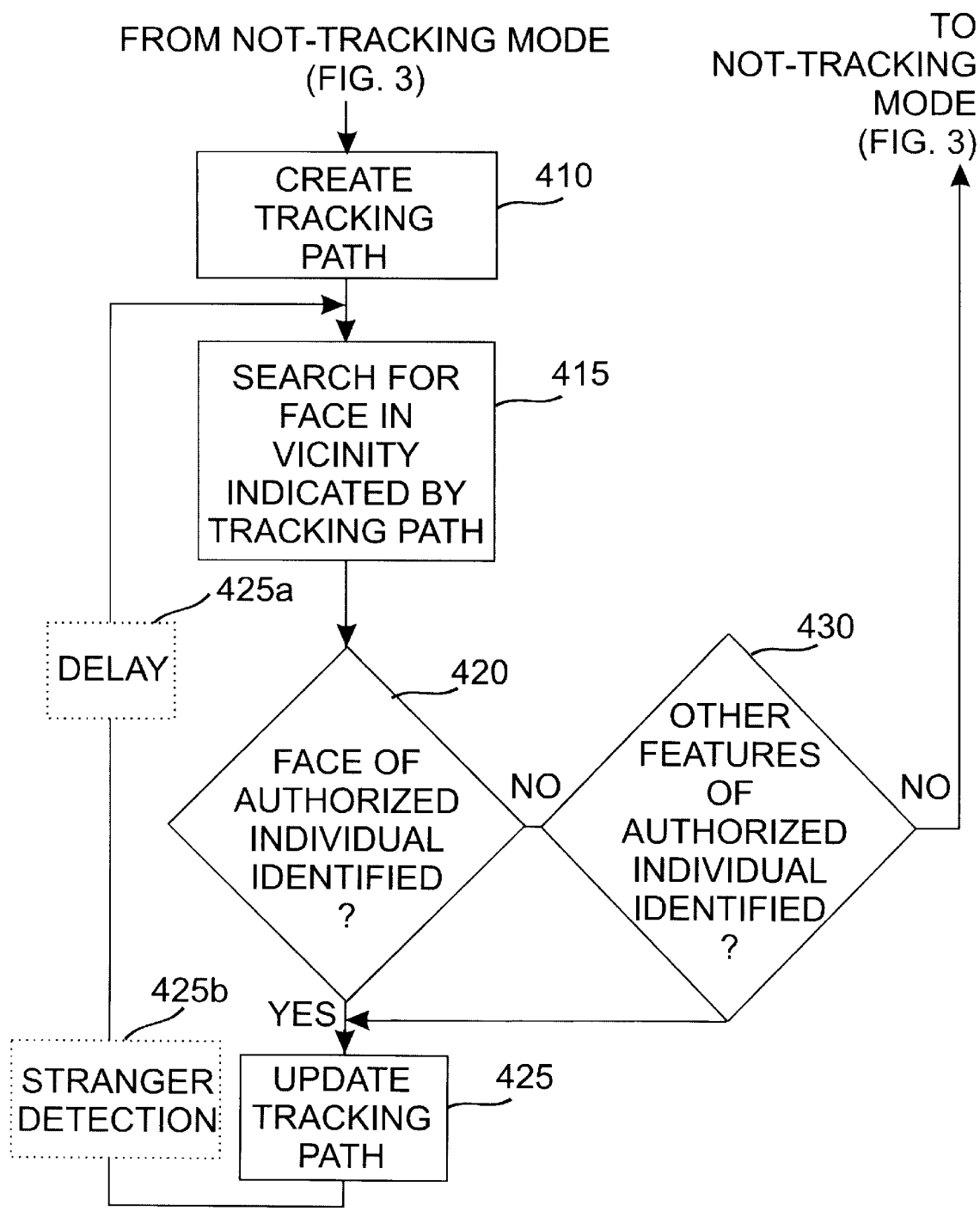
FIG. 4 is a flowchart depicting the tracking mode of the continuous monitoring system of the present invention.

The continuous monitoring system of the present invention preferably comprises two modes: a not-tracking mode and a tracking mode. These two modes are described in connection with FIGS. 3 and 4. The continuous monitoring system depicted in FIGS. 3 and 4 is implemented in face recognition software 160 which runs on CPU 110 of computer system 100.

During periods when no one is detected in the field of view of video camera 150, the system remains in not-tracking mode. In this mode, the screen and keyboard of terminal 130 are disabled, thus preventing access to the data or application programs of computer system 100.

The not-tracking mode may be divided into three sub-modes. In the first sub-mode, which comprises steps 310–315 of FIG. 3, the system repeatedly searches for a human face in the field of view of video camera 150. Thus, in step 310 the system searches the field of view of video camera 150 to determine whether it contains a human face. This step corresponds to detection step 210 described above in connection with FIG. 2.

If a face is not detected in step 310, decision step 315 fails and the system returns to step 310 to continue searching for a face in the field of view of video camera 150.

If a face is detected in step 310 (e.g., if an individual sits down to work at terminal 130 and thus enters the field of view of video camera 150), decision step 315 succeeds and the system proceeds to sub-mode two of the not-tracking mode. In sub-mode two, the system constructs a face template of the detected face. Thus, in step 325 the system extracts the detected face from the video signal provided by video camera 150. This step corresponds to alignment step 220 and normalization step 230 described above in connection with FIG. 2. After alignment and normalization have been performed, the system proceeds to step 330 where it converts the facial image into a facial representation or template as described above in connection with representation step 240 of FIG. 2.

At this point, the system enters sub-mode three of the not-tracking mode which comprises matching the acquired facial representation against the stored facial representations of individuals authorized to use computer system 100. As shown in FIG. 3, steps 335–350 comprise a loop which successively compares the acquired representation with each of the stored representations of authorized individuals until a match is found or until all of the stored representations have been examined. As noted above, the stored representations are generated from the images of authorized individuals stored in image memory 170 and are maintained in face templates memory 140.

Continuing with FIG. 3, if no match is found in steps 335–350, the system returns to step 310 of sub-mode one. If, on the other hand, a match is found, decision step 340 succeeds and the individual in the field of view of video camera 150 is granted access to computer system 100 as indicated in step 355. In one preferred embodiment, this grant of access consists simply of enabling both the keyboard and screen of terminal 130. In a second preferred embodiment, the grant of access may be tailored to the authorization level of the individual. For example, a person with a particular authorization level might be granted access to only certain data stored in memory 120 or might be permitted to run only certain application programs.

It will be appreciated that the not-tracking mode described above provides completely passive access to computer system 100. That is, access to computer system 100 is acquired without the need to enter a password or other identifier, and with no need for a magnetic card or other "key."

Once an individual has been granted access to computer system 100, the system enters the tracking mode. In this mode, the system continuously tracks the authorized individual and continues to permit access to computer system 100 only while the individual remains within the field of view of video camera 150.

In particular, once an individual is granted access to computer system 100 in step 355 of FIG. 3, the system immediately proceeds to step 410 of FIG. 4 where it registers the authorized individual's current head position, shape, size, color and facial representation and stores this in memory 120 as a new tracking path. The data stored in the tracking path can be generated using commercially available software such as the FaceIt Developer Kit, a copy of which may be found in microfiche appendix A of this application. This tracking path is used in subsequent searches to determine whether the authorized user remains in the field of view of video camera 150.

Specifically, in step 415 the system retrieves the current head location of the authorized user from memory 120 and searches for a face in the vicinity of that location. If a face is found, the system converts the newly acquired facial image to a facial representation and compares that representation to the one stored in the tracking path. As is well known in the art, this comparison may be performed through template matching using a normalized correlator. A match is declared to exist if the normalized correlator is larger than a preset threshold value. In a preferred embodiment, computer system 100 may also compare the newly acquired representation to the facial representations stored in the face template database. As described below, when these comparisons sufficiently confirm the continued presence of the authorized individual, continued access to computer system 100 is provided.

Thus, in decision step 420, the system determines whether the acquired representation matches the facial representation stored in the tracking path. If decision step 420 succeeds, then access to computer system 100 is continued, and the system proceeds to step 425 where the information stored in the tracking path is updated in accordance with the latest acquired representation. From step 425, the system loops back to step 415, and a new search is begun. In this way, the identity of the authorized user is repeatedly confirmed.

At times, however, decision step 420 may fail even when the authorized individual continues to sit before terminal 130. This may happen, for example, if the individual looks down or away from the screen of terminal 130 (and thus is not facing video camera 150) or if his facial features are temporarily partially blocked. Therefore, as described below, when the system is unable to identify the facial features of an individual in the field of view, it proceeds to a second order identification scheme to confirm the continuing presence of the authorized individual.

Specifically, if decision step 420 fails, the system proceeds to decision step 430 where the system attempts to confirm the continuing presence of the authorized individual on the basis of other recorded features such as head location, shape, color, and size which are stored as part of the tracking path. In a preferred embodiment, step 430 may be composed of two sub-steps. In the first sub-step, the system retrieves the most recent head-location of the authorized individual from the tracking path and determines whether the field of view of video camera 150 now contains a head-shaped object in or near that location. If a head-shaped object is identified, the system proceeds to sub-step two and determines whether other features of the detected head-shaped object such as its shape, size and color, match the features stored as part of the tracking path. A score is assigned to the results of this matching process, and if the score is above a predetermined threshold, decision step 430 succeeds and access to computer system 100 is continued. In that event, the stored tracking path is updated in step 425, and the system returns to step 415 to repeat the tracking.

Otherwise, if sub-step one fails (i.e., no head shaped object is detected) or if sub-step two fails (i.e., the matching score of the additional features is too low to indicate a match), then step 430 fails. In that event, the system disables the keyboard and screen of terminal 130, and returns to step 310 of the not-tracking mode. In this way, the system immediately revokes access when the presence of the authorized individual ceases to be detected.

In a preferred embodiment, because identification on the basis of these additional features is less certain than facial identification, the system requires a closer spatial proximity between the detected head-shaped object and the head location stored in the tracking path than would be required to confirm a match on the basis of facial identification. This ensures the accuracy of the identification since it is impossible for an unauthorized individual to occupy the space of the authorized individual within a single cycle of the tracking mode.

It should be noted that in this preferred embodiment, the continuous monitoring cycle represented by steps 415–430 of the tracking mode is repeatedly executed as fast as the hardware will allow. On standard Pentium (™) hardware the time required to complete each monitoring cycle is approximately 10 to 20 milliseconds. As those skilled in the art will appreciate, when other applications in addition to the continuous monitoring program are being run on the CPU, multitasking may be employed to execute the continuous monitoring program and the other applications concurrently. In some cases, this may somewhat increase the cycle time to, for example, 30 milliseconds.

In an alternative embodiment, the tracking mode may comprise a delay step 425*a* between step 425 and step 415. Delay step 425*a* causes the tracking mode to confirm the user's identity periodically rather than continuously. As will be recognized, this alternative places fewer demands on the resources of computer system 100 but provides somewhat decreased security.

In a preferred embodiment, the continuous monitoring system of the present invention may comprise an additional feature which, during tracking mode, continuously searches for additional individuals who have entered the field of view of video camera 150. This may occur, for example, if an unauthorized individual approaches the authorized individual from behind and positions himself to read data displayed on the screen of terminal 130 over the shoulder of the authorized individual. When equipped with this feature, the tracking mode comprises an additional step 425*b* which continuously searches for the presence of a second, unauthorized individual within reading distance of the screen of terminal 130. When such an individual is detected, the system either disables the screen or prints a warning message to the authorized user.

In an alternative embodiment, the system employs the not-tracking mode to regulate initial access to computer system 100, but substitutes an inactivity-detection mode for the tracking mode of the preferred embodiment to regulate continuing access to computer system 100. In this alternative embodiment, the system interprets prolonged inactivity by the authorized user as evidence that the authorized user has left the vicinity of terminal 130. A preferred embodiment of the inactivity-detection mode of the present invention is described in connection with FIG. 5.

Recall that when an authorized user is recognized by the not-tracking mode, access is granted to computer system 100 (step 355 of FIG. 3) and the not-tracking mode terminates. The system then proceeds to the inactivity-detection mode charted in FIG. 5 which employs the screen saver feature resident in most operating systems to revoke access to computer system 100 and to return the system to the not-tracking mode.

It is well known in the art that most operating systems comprise a screen saver feature. In accordance with this feature, when the operating system detects a preestablished period of user inactivity (e.g., no keyboard activity), it automatically launches a screen saver application program. Generally, the user may set the period's length and may choose the particular screen saver program to be launched. As described below, this embodiment employs a particular screen saver program written specifically to achieve the objects of the present invention.

Figure 5:
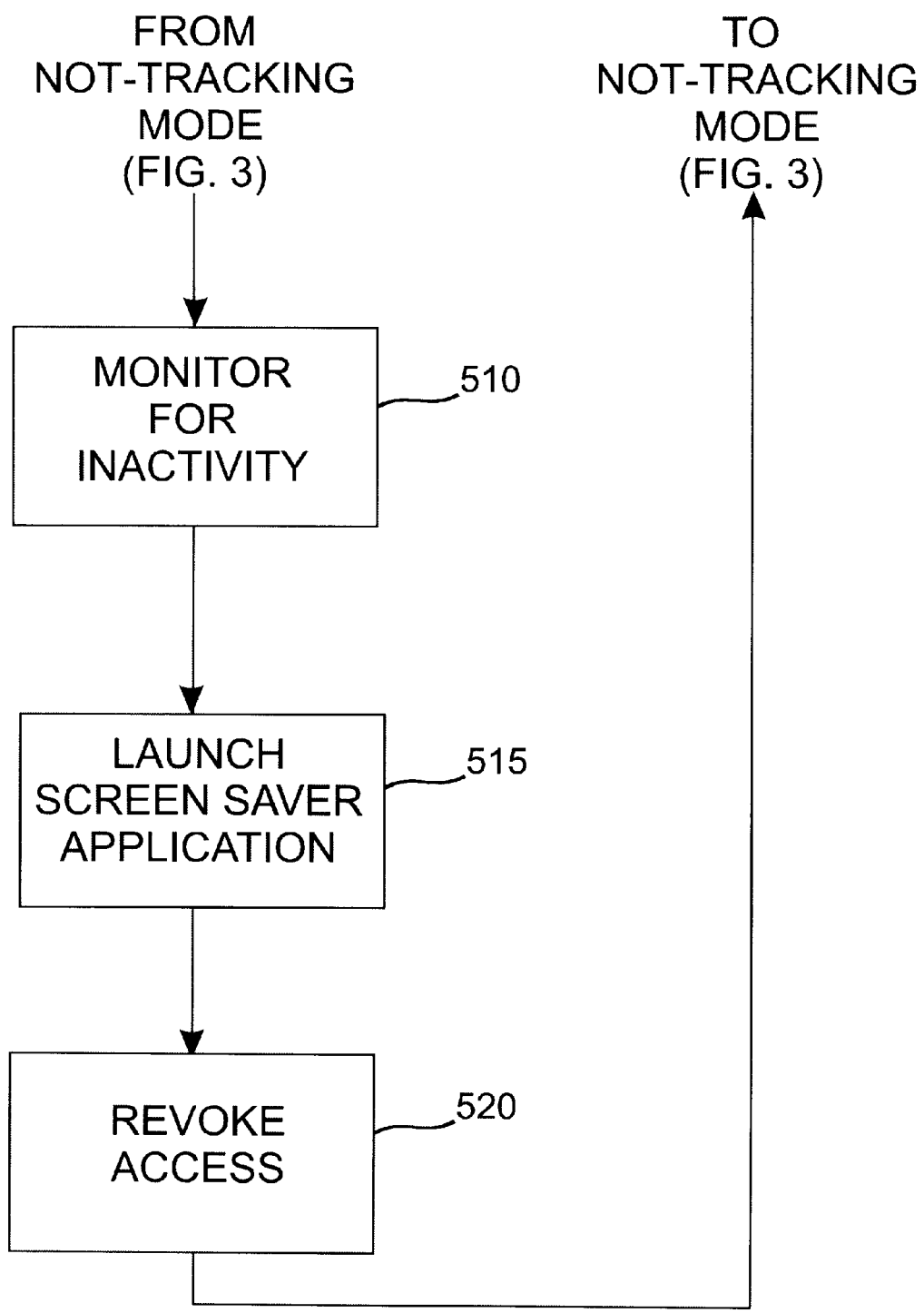
FIG. 5 is a flowchart depicting an inactivity detection mode.

Specifically, in step 510 of FIG. 5, the operating system continuously monitors for a period of inactivity greater than the preestablished period. When such a period is detected, the system proceeds to step 515 wherein the operating system launches the screen saver program. The screen saver program comprises code which directs computer system 100 to disable the keyboard and screen of terminal 130 and to return the system to not-tracking mode. Accordingly, in step 520 access to computer system 100 is revoked, and the system returns to the not-tracking mode.

In this way, access is denied to computer system 100 during prolonged periods of inactivity by the authorized user. This alternative embodiment is less expensive than the preferred embodiment described above and places fewer demands on the resources of computer system 100. It does not, however, immediately revoke access when the authorized user leaves terminal 130 and therefore provides somewhat less security than the continuous tracking of the preferred embodiment.

Figure 6:
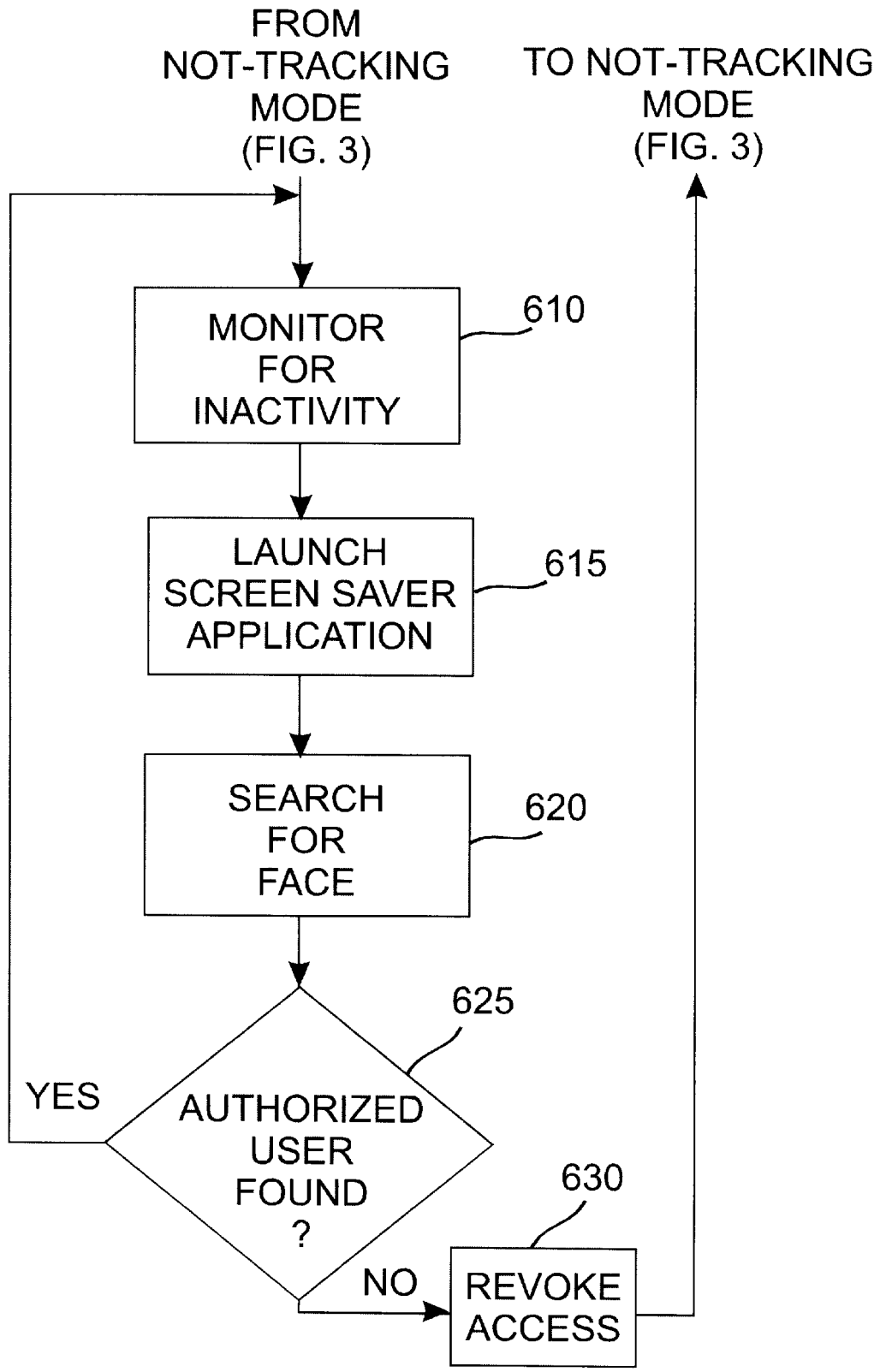
FIG. 6 is a flowchart depicting an alternative inactivity detection mode.

In a related alternative embodiment, the screen saver program directs the system to examine the field of view of video camera 150 for the presence of the authorized individual before disabling the keyboard and screen of terminal 130. This embodiment is described in connection with FIG. 6.

Steps 610 and 615 of this embodiment are identical to steps 510 and 515 of the embodiment charted in FIG. 5. Thus, in steps 610 and 615, the operating system continuously monitors the keyboard for a pre-set period of inactivity and launches the screen saver application when such a period is detected.

In step 620, however, the screen saver program directs the system to search the field of view of video camera 150 for the face of the authorized individual initially granted access by the not-tracking mode. If the authorized individual is detected, decision step 625 succeeds, and continued access to the system is provided. Otherwise, decision step 625 fails, and the system proceeds to step 630 wherein access is revoked. From step 630, the system returns to the not-tracking mode.

It will be appreciated that this alternative embodiment beneficially maintains continued access despite long periods of inactivity by the authorized individual as long as the authorized individual remains at terminal 130.

In a second related alternative embodiment, the system may maintain continued access despite prolonged inactivity as long as any motion is detected in the field of view of video camera 150. This embodiment is identical to that shown in FIG. 6, except that in steps 620 and 625 the system searches the field of view for any movement, rather than for the presence of the authorized individual. This embodiment avoids the need for performing face recognition in steps 620 and 625 while providing continued access only when there is some indication that the authorized individual is still present.

State of the art recognition software can compare an acquired representation against up to 300 stored representations per second when run on a standard Pentium (™) processor. Therefore, when the number of authorized individuals is small, the system can quickly determine whether a particular individual is authorized.

When the number of authorized individuals is large, however, the time required to identify an individual may be substantial. Illustratively, in the present state of the art, the mean time to confirm the identity of an individual in a computer system with 25,000 authorized users is slightly over 40 seconds.

Figure 7:
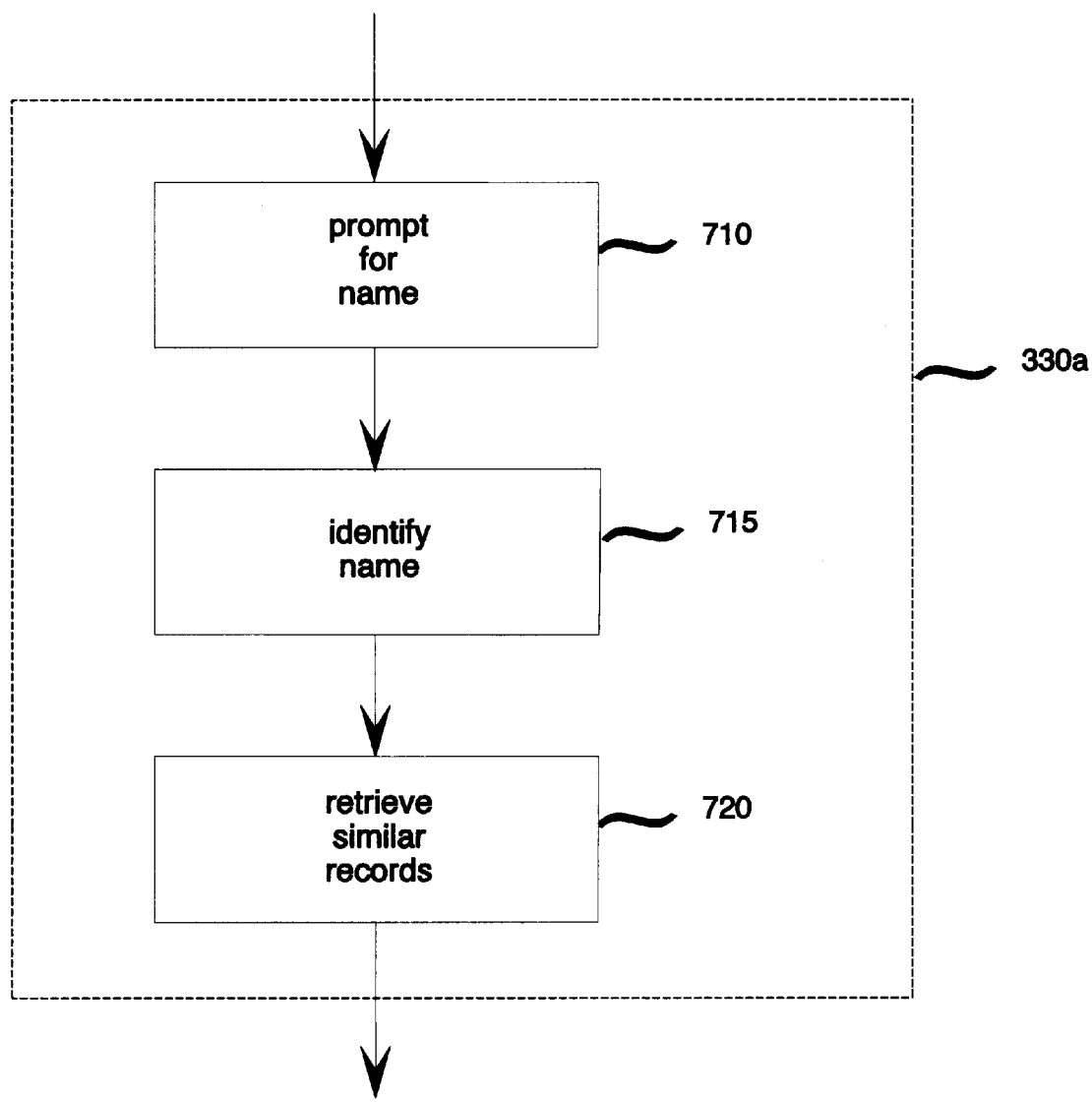
FIG. 7 is a flowchart depicting a speech recognition sub-mode of the not-tracking mode shown in FIG. 3.

Consequently, in a further preferred embodiment, the not-tracking mode additionally comprises a speech recognition sub-mode designed to decrease the number of comparisons performed in steps 335–350 of FIG. 3. The speech recognition sub-mode is concisely indicated as step 330a in FIG. 3. A preferred embodiment of this sub-mode is more fully described in conjunction with FIG. 7.

Recall that in step 330 of FIG. 3 the not-tracking mode creates an acquired facial representation of an individual in the field of view of video camera 150. In this preferred embodiment, before the comparison loop represented by steps 335–350 commences, the system proceeds to step 710 wherein the individual is prompted to say his name or any other user specific phrase. In step 715, speech recognition software is employed to detect and identify the name spoken by the individual. An example of speech recognition software suitable for this purpose is the Power Secretary by Articulate Systems.

In step 720, the system retrieves from face template memory 140 the facial representations of all individuals whose names sound similar to the name spoken by the individual. The acquired representation is then compared only to the facial representations in this reduced universe. In this way, fast authorization determinations are possible on standard inexpensive hardware even when the universe of authorized individuals is large.

It is noted that the preferred embodiment charted in FIG. 3 employs face recognition to initially detect the presence of an individual. Speech recognition is used only to reduce the number of necessary comparisons. Alternatively, the system might instead employ speech recognition to initially detect the presence of an individual and launch the face recognition software only when an individual has been detected.

In a further preferred embodiment, the not-tracking mode may comprise a surveillance feature which stores the facial representations of unauthorized individuals who approach terminal 130 during the absence of the authorized user. When equipped with this feature, the not-tracking mode is provided with an additional step 345a, shown in broken lines in FIG. 3. Recall that when decision step 345 succeeds, the system concludes that the individual in the field of view of video camera 150 is not an authorized individual. Then, in this preferred embodiment, the system proceeds to step 345a wherein the facial representation of the unauthorized individual is stored in a surveillance log in memory 120. Later, when the system detects the return of the authorized individual (step 340 of FIG. 3), it may display to the authorized individual a video image of any unauthorized individuals who approached terminal 130 during the authorized individual's absence.

In a further preferred embodiment, the system can, while in not-tracking mode, serve as a multimedia messaging center. In this embodiment, when steps 335–350 of the not-tracking mode ascertain that a face in the field of view of video camera 150 does not belong to an authorized individual, the system plays a prerecorded multimedia greeting message on terminal 130 (step 345b). This message may contain both a visual portion displayed on the screen of terminal 130 as well as an audio portion if terminal 130 is provided with speakers. The greeting message offers the unauthorized individual the option of leaving a multimedia message for an authorized individual. In various preferred embodiments, the message may comprise a video component (using video camera 150), an audio component (using a microphone), a text component (using the keyboard of terminal 130), or any combination of the above. The entered message is stored by the system (step 345c). Later, when the system detects the return of the authorized individual (step 340 of FIG. 3), it informs the individual of any messages received in the individual's absence and gives the individual the option to play back the messages.

Aspects of this embodiment may be especially appropriate in securing certain physical environments, such as a family home. For example, a system embodying the not-tracking mode of the present invention in combination with the multimedia message center feature, could grant access to members of the family, while denying access to others. In addition, when a non-member of the family was recognized by the system, it could give the non-member the opportunity to leave a message for one or more of the family members.

The preferred multimedia messaging center of the present invention profits greatly from its use of face recognition.

Figure 8:
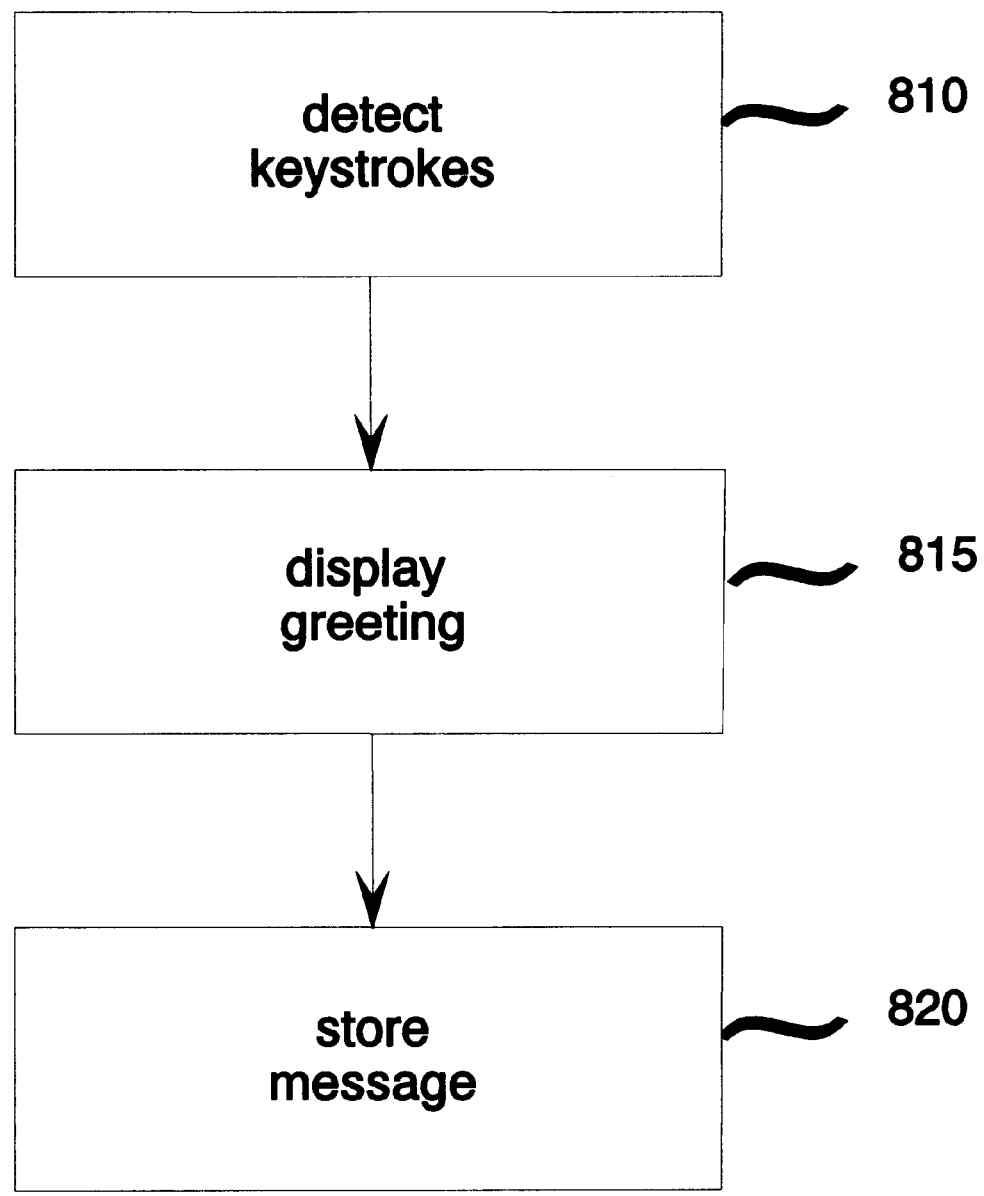
FIG. 8 is a flowchart depicting the operation of a multimedia messaging center which does not employ face recognition.

Specifically, face recognition permits the multimedia messaging center to automatically distinguish between authorized and unauthorized individuals and to display a greeting to unauthorized individuals only. It should be recognized, however, that the multimedia messaging center of the present invention may be implemented without the use of face recognition, as well. One such embodiment is shown in FIG. 8. This embodiment is suitable, for example, in an office environment wherein each employee is allocated a PC for his primary use.

As shown in FIG. 8, the multimedia messaging center remains quiescent until, in step 810, it is restored by a visitor who enters a unique keystroke pattern via the keyboard of the PC (e.g., alt-m). When thus restored, the multimedia messaging center proceeds to step 815 wherein it displays a greeting to the visitor and offers the visitor the opportunity to leave a message for the PC's primary user. In step 820, the messaging center stores the message left by the visitor, and displays a flag on the PC's monitor indicating the existence of a message. When the user returns, he may retrieve the message.

A preferred embodiment of an enrollment program for storing the facial images of authorized users is now described. This preferred embodiment employs a software program which may be run only by a system administrator or someone with super-user privileges. The enrollment program is described in connection with FIG. 9.

Figure 9:
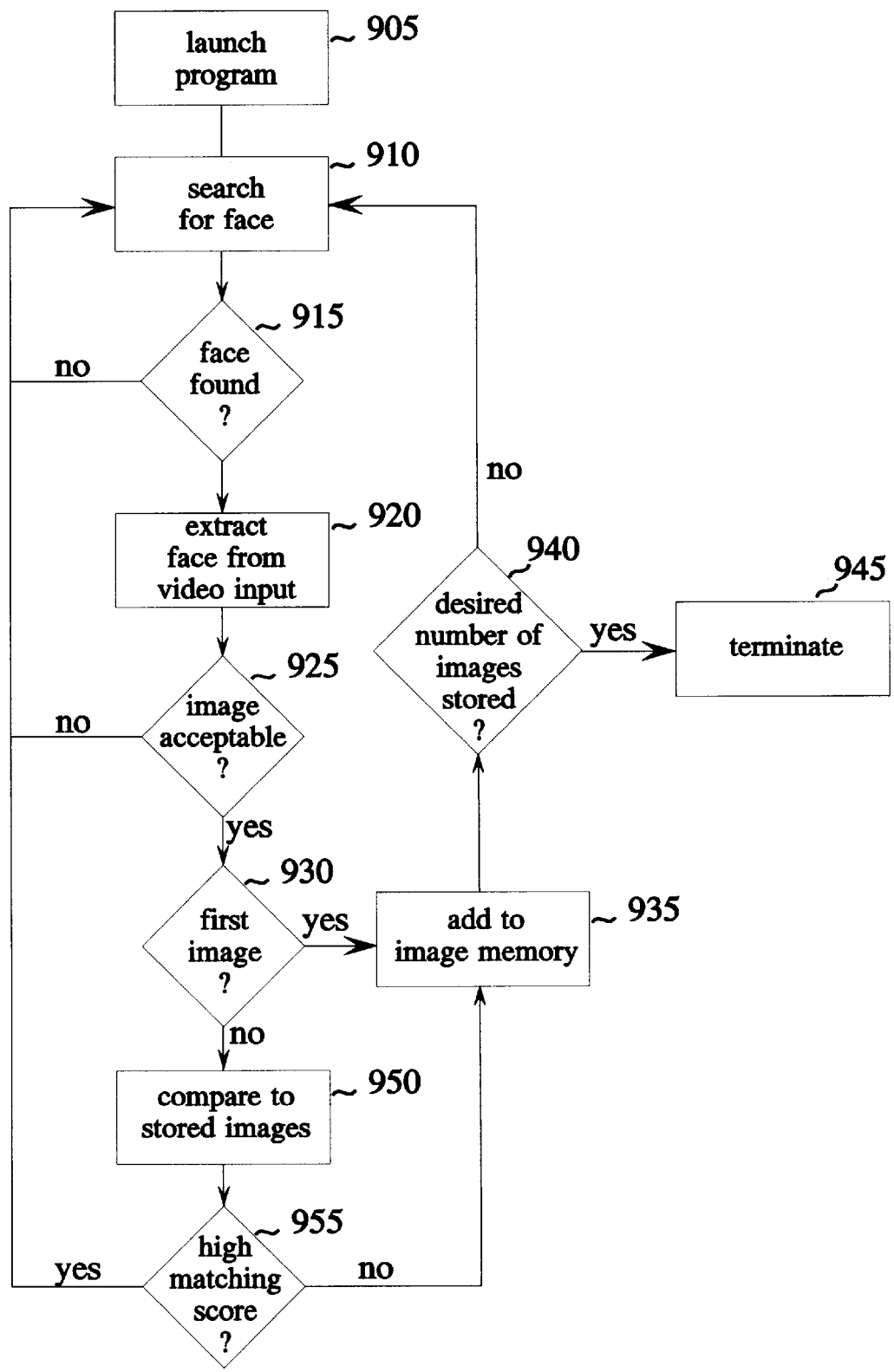
FIG. 9 is a flowchart depicting an enrollment program for storing the facial images of individuals authorized to have access to a restricted environment.
Figure 10:
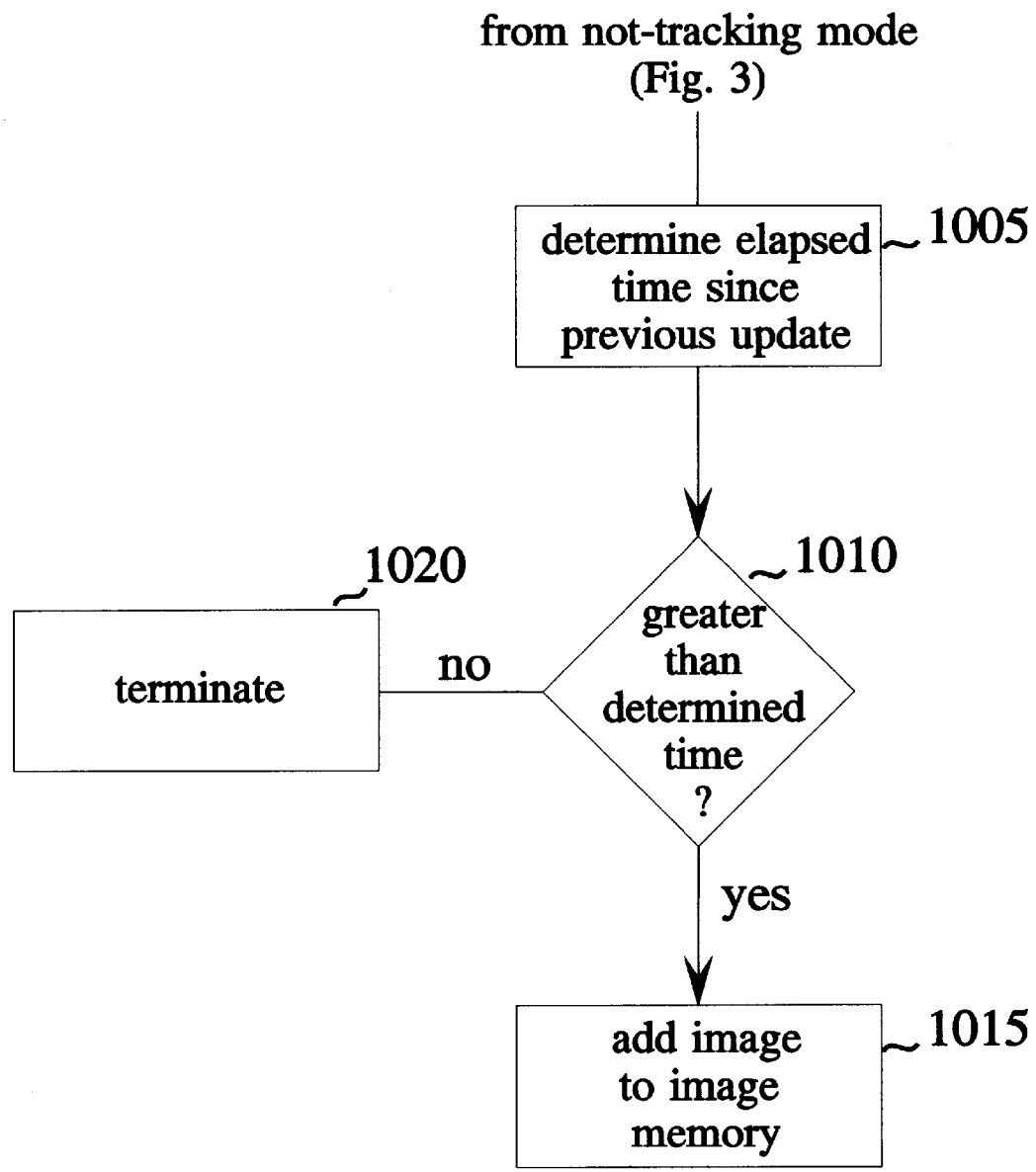
FIG. 10 is a flowchart depicting an adaptive enrollment program for updating the stored images of individuals authorized to have access to a restricted environment.

Turning to FIG. 9, in step 905 the system administrator launches the enrollment program. In steps 910 and 915, the system continuously searches for the face of an enrollee in the field of view of video camera 150. Once a face is found, decision step 915 succeeds and the system proceeds to step 920 wherein the detected face is extracted from the video signal and displayed as an image on the monitor of terminal 130. Steps 910–920 may be performed using commercially available software such as CHead::FindHeadPosition, CAlignment::FindAlignedPosition, and CFace::GetCanonicalmage of the FaceIt Developer Kit. A copy of the object code of these functions is found in microfiche Appendix A of this application.

In step 925, the administrator is given the option of discarding this acquired image. This option is provided because it has been found that many enrollees do not wish an unflattering image of themselves to be stored in memory. If the system administrator rejects the image, then decision step 925 fails and the system returns to step 905 to search again for a face in the field of view of video camera 150.

Otherwise, step 925 succeeds and the system proceeds to decision step 930. There, the system determines whether the captured image is the first image acquired for the enrollee. If it is, decision step 930 succeeds and the system stores the image in image memory 170 (step 935).

As those skilled in the art will recognize, it is possible to construct a face template from a single image of an individual. It is preferable, however, to employ two or more images in constructing the template since this yields a more refined template and commensurately more accurate face recognition.

In addition, in order to achieve a substantial refinement in the template, it is important that the plurality of images from which the template is derived be substantially dissimilar. Otherwise, the marginal information content added by each additional image is small and does not significantly improve the quality of the template. For this reason, the preferred enrollment embodiment of the present invention discards additional captured images of the enrollee unless they differ substantially from those images already stored in image memory 170.

Specifically, returning to FIG. 9, once an image has been stored in image memory 170 (step 935), the system proceeds to decision step 940 wherein it is determined whether the desired number of stored images for this enrollee have been acquired. If decision step 940 succeeds, then the system has stored the desired number of images for this enrollee and the enrollment program terminates (step 945).

Otherwise, decision step 940 fails and the system returns to steps 910–925 to acquire another acceptable image of the enrollee. The system then proceeds to decision step 930 which now fails since an image of the enrollee has already been stored in image memory 170. The system therefore proceeds to step 950.

The purpose of steps 950 and 955 is to ensure that the second captured image is sufficiently different from the first captured image to justify its addition to the database. Thus, in step 950, the system converts both the second acquired image and the first acquired image into templates and compares the two. A high matching score indicates that the two images are not significantly distinct. In that event, decision step 955 succeeds and the second image is discarded. Illustratively, the threshold score required to discard an image in step 955 of FIG. 9 might be the same as the score required to identify an individual in step 340 of FIG. 3. When decision step 955 succeeds, the system returns to step 910 to acquire another image of the enrollee.

If, however, the matching score of the comparison is low, then decision step 955 fails, and the second image is added to image memory 170. The process is then repeated until the desired number of dissimilar images is stored in image memory 170. Once the desired number of images have been stored, decision step 940 fails, and the enrollment program terminates.

In a preferred embodiment, the enrollment program can comprise an adaptive enrollment scheme which periodically adds an updated image of the authorized individual to image memory 170. This preferred embodiment is described in connection with FIG. 10.

Recall that when an authorized user is recognized by the not-tracking mode, access is granted to computer system 100 (step 355 of FIG. 3) and the not-tracking mode terminates. In this preferred embodiment, the system then proceeds to step 1005 wherein it determines the amount of time that has passed since an image of the authorized individual was added to image memory 170. If that amount of time exceeds a predetermined amount (which may be set by the system administrator), decision step 1010 succeeds, and the image of the authorized individual acquired in step 325 of FIG. 3 is added to image memory 170 (step 1015). Otherwise, decision step 1010 fails, and the enrollment program terminates (step 1020).

In this way, image memory 170 is periodically updated to reflect changes in the appearance of the authorized individual. As a result, the system can continue to recognize the authorized individual even as his appearance changes over time.

Preferably, the initial images stored at the time of enrollment are never erased, but the additional images added periodically may be replaced during subsequent periodic updates.

It should be recognized that this preferred adaptive enrollment embodiment conveniently updates the stored images of an authorized individual without requiring the individual to participate in a new enrollment procedure.

While the invention has been described in conjunction with specific embodiments, it is evident that numerous alternatives, modifications, and variations will be apparent to those skilled in the art in light of the foregoing description.

What is claimed is:

1. A method of regulating continued access to a restricted environment, comprising:

storing a facial representation of an individual authorized to have access to the restricted environment;

periodically acquiring a facial representation of an individual desiring continued access to the restricted environment;

determining repeatedly whether the individual seeking continued access is the authorized individual by comparing the most recently acquired representation to the stored representation to determine the degree to which the most recently acquired representation corresponds to the stored representation;

storing additional identifying features representative of an authorized individual;

acquiring additional identifying features of the individual desiring continued access to the restricted environment;

comparing the acquired additional features and the stored additional features when the degree of similarity between the most recently acquired facial representation and the stored facial representation does not confirm the identity of the individual seeking continued access;

revoking access to the restricted environment if the step of determining and the step of comparing indicate that the individual seeking continued access is not the authorized individual.

2. The method of claim 1 wherein the additional identifying features comprise the head location, head shape, and head size of the authorized individual.

3. The method of claim 1 wherein the stored representation is modified by at least a portion of the acquired representations.

4. The method of claim 1 further comprising:

determining if no individual is seeking access to the restricted environment; and revoking access to the restricted environment if the determination indicates that no individual is seeking access to the restricted environment.

5. The method of claim 1 wherein the restricted environment is a physical environment.

6. The method of claim 1 wherein a video camera is employed to acquire a facial image of the individual seeking access to the restricted environment.

7. The method of claim 1 wherein the comparison is performed in real-time.

8. The method of claim 1 wherein the step of acquiring a facial representation comprises the steps of:

detecting the presence of a face in a field of view;

aligning the detected face;

normalizing the detected face; and representing the detected face as a template.

9. The method of claim 1, further comprising:

monitoring the environment for periods of inactivity greater than a predetermined length; and revoking access to the environment when such period of inactivity is detected.

10. The method of claim 1 further comprising a method of regulating initial access to the restricted environment, comprising:

storing facial representations of individuals authorized to have access to the restricted environment;

acquiring a representation of the face of an individual who approaches the restricted environment during a period when access to the restricted environment is impeded;

comparing the initial acquired representation to the stored representations; and denying initial access to the restricted environment if the comparison indicates that the individual seeking initial access is not an authorized individual.

11. The method of claim 10 further comprising:

discerning the presence of a face in the field of view of a video camera.

12. The method of claim 1 wherein the restricted environment is a virtual environment.

13. The method of claim 12 wherein the virtual environment is a computer network environment.

14. The method of claim 12 wherein the virtual environment is a PC environment.

15. A method of regulating initial and continued access to a restricted environment, comprising:

storing facial representations of individuals authorized to have access to the restricted environment;

acquiring a first representation of the face of an individual who approaches the restricted environment during a period when access to the restricted environment is impeded;

comparing the first acquired representation to the stored representations;

denying initial access to the restricted environment if the comparison indicates that the individual seeking initial access is not an authorized individual and granting initial access to the restricted environment if the comparison indicates that the individual seeking initial access is an authorized individual;

acquiring a second facial representation of an individual desiring continued access to the restricted environment;

determining whether the individual seeking continued access is the authorized individual by comparing the second acquired representation to at least one of the stored representations;

revoking access to the restricted environment if the determination indicates that the individual seeking continued access is not the authorized individual;

if initial access is denied, displaying a greeting to the unauthorized individual; and storing a message for an authorized individual from the unauthorized individual.

16. The method of claim 15 wherein the message comprises a text portion.

17. The method of claim 15 wherein the message comprises an audio portion.

18. The method of claim 15 wherein the message comprises a visual portion.

19. A method of regulating continued access to a restricted environment, comprising:

storing a facial representation of an individual authorized to have access to the restricted environment;

acquiring a facial representation of an individual desiring continued access to the restricted environment;

determining whether the individual seeking continued access is the authorized individual by comparing the acquired representation to the stored representation;

revoking access to the restricted environment if the determination indicates that the individual seeking continued access is not the authorized individual;

detecting the approach of an unauthorized second individual to the restricted environment; and revoking access of the authorized individual to the restricted environment when the approach of the unauthorized individual is detected.

20. A method of regulating initial access to a restricted environment, comprising:

storing a plurality of facial representations of individuals authorized to have access to the restricted environment;

associating one or more words with each authorized individual;

acquiring a representation of the face of an individual who approaches the restricted environment during a period when access to the restricted environment is impeded;

recognizing the linguistic content of the one or more words when spoken by an individual seeking access to the restricted environment;

comparing the acquired representation only against the facial representations of individuals with whom the recognized one or more words are associated;

denying initial access to the restricted environment if the comparison indicates that the individual seeking initial access is not an authorized individual.

21. A continuous monitoring system for regulating access to a restricted environment, comprising:

a CPU;

a memory connected to the CPU;

a tracking path stored in the memory comprising data regarding an individual authorized to have access to the restricted environment;

the tracking path comprising at least a facial representation of the authorized individual;

a video input device connected to the CPU and having a field of view;

an image translator resident in the CPU for repeatedly receiving images in the field of view and generating therefrom data regarding an individual located in the field of view;

a comparator resident in the CPU for repeatedly comparing the generated data with the tracking path, the results of each comparison constituting a comparison result;

an access control device resident in the CPU operative in response to the comparison results;

wherein the generated data comprises a facial representation of the individual in the field of view when it is possible to acquire a facial representation of the individual;

wherein the tracking path and the generated data further comprise additional identifying data regarding the authorized individual located in the field of view; and wherein the comparator compares the additional generated data and the additional tracking path data when it is impossible to acquire a facial representation of the individual in the field of view.

22. The system of claim 21 wherein the generated data comprises a facial representation of the individual in the field of view.

23. The system of claim 21 wherein the tracking path comprises the most current data available regarding the authorized individual.

24. The system of claim 21 wherein the access control device denies access to the restricted environment when the comparison result indicates the absence of the authorized individual.

25. The system of claim 21 wherein the image translator, comparator, and access control device operate in real-time.

26. The system of claim 21 wherein the additional data comprise the head location, head shape, and head size of the authorized individual.

27. The system of claim 26 wherein the current data is at least partially derived from the additional generated data.

28. A monitoring system for regulating continued access to a restricted environment, comprising:

means for storing a facial representation of an individual authorized to have access to the restricted environment;

means for acquiring a facial representation of an individual desiring continued access to the restricted environment;

means for repeatedly determining whether the individual seeking continued access is the authorized individual by comparing the acquired representation and the stored representation;

means for revoking access to the restricted environment if the determination indicates that the individual seeking continued access is not the authorized individual;

second means for storing additional identifying features representative of an authorized individual;

second means for acquiring additional identifying features of an individual desiring continued access to the restricted environment;

wherein the means for determining comprises a means for comparing the acquired additional features and the stored additional features when the degree of similarity between the most recently acquired facial representation and the stored facial representation does not confirm the identity of the individual seeking continued access.

29. The system of claim 28 further comprising:

means for periodically acquiring subsequent facial representations of at least one individual desiring continued access to the restricted environment;

means for repeatedly determining the degree to which the most recently acquired representation corresponds to the stored representation of the authorized individual.

30. The system of claim 28 wherein the additional identifying features comprise the head location, head shape, and head size of the authorized individual.

31. The system of claim 28 wherein the stored representation is modified by at least a portion of the acquired representations used to identify the individual desiring continued access to the restricted environment.

32. The system of claim 28 further comprising means for determining if no individual is seeking access to the restricted environment; and means for revoking access to the restricted environment if the determination indicates that no individual is seeking access to the restricted environment.

33. The continuous video monitoring system of claim 28 wherein the restricted environment is a physical environment.

34. The system of claim 28 wherein the means for acquiring comprises a video camera.

35. The system of claim 28 wherein the means for comparing operates in real-time.

36. The system of claim 28 wherein the means for acquiring a facial representation comprises:

means for detecting the presence of a face in a field of view;

means for aligning the detected face;

means for normalizing the detected face; and means for representing the detected face as a template.

37. The system of claim 28, further comprising:

means for monitoring the environment for periods of inactivity greater than a predetermined length; and means for revoking access to the environment when such period of inactivity is detected.

38. The system of claim 28 further comprising means for regulating initial access to the restricted environment, comprising:

means for storing facial representations of individuals authorized to have access to the restricted environment;

means for acquiring a representation of the face of an individual who approaches the restricted environment during a period when access to the restricted environment is impeded;

face recognition means for comparing the initial acquired representation to the stored representations; and means for denying initial access to the restricted environment if the comparison indicates that the individual seeking initial access is not an authorized individual.

39. The system of claim 38 wherein the means for acquiring comprises:

a video input device having a field of view, and means for discerning the presence of a face in the field of view.

40. The system of claim 28 wherein the restricted environment is a virtual environment.

41. The system of claim 40 wherein the virtual environment is a computer network environment.

42. The system of claim 41 wherein the virtual environment is a PC environment.

43. A monitoring system for regulating initial and continued access to a restricted environment, comprising:

means for storing facial representations of individuals authorized to have access to the restricted environment;

means for acquiring a first representation of the face of an individual who approaches the restricted environment during a period when access to the restricted environment is impeded;

face recognition means for comparing the first acquired representation to the stored representations;

means for denying initial access to the restricted environment if the comparison indicates that the individual seeking initial access is not an authorized individual and for granting initial access to the restricted environment if the comparison indicates that the individual seeking initial access is an authorized individual;

means for acquiring subsequent facial representations of an individual desiring continued access to the restricted environment;

means for repeatedly determining whether the individual seeking continued access is the authorized individual by comparing the subsequent acquired representations and at least one of the stored representations;

means for revoking access to the restricted environment if the means for determining determines that the individual seeking continued access is not the authorized individual;

means, operative upon detection of an unauthorized individual, for displaying a greeting to the unauthorized individual and message means for enabling the unauthorized individual to leave a message for an authorized individual.

44. The system of claim 43 wherein the message means comprises means for leaving a typewritten message.

45. The system of claim 43 wherein the message means comprises means for leaving a spoken message.

46. The system of claim 43 wherein the message means comprises means for leaving a message comprising both audio and visual components.

47. A monitoring system for regulating continued access to a restricted environment, comprising:

means for storing a facial representation of an individual authorized to have access to the restricted environment;

means for acquiring a facial representation of an individual desiring continued access to the restricted environment;

means for repeatedly determining whether the individual seeking continued access is the authorized individual by comparing the acquired representation and the stored representation;

means for revoking access to the restricted environment if the determination indicates that the individual seeking continued access is not the authorized individual;

means for detecting the approach of an unauthorized second individual to the restricted environment; and means, triggered by detection of the unauthorized second individual, for revoking access of the authorized individual to the restricted environment.

48. A system for regulating initial access to a restricted environment, comprising:

means for storing a plurality of facial representations of individuals authorized to have access to the restricted environment;

means for associating one or more words with each authorized individual;

means for acquiring a representation of the face of an individual who approaches the restricted envioronment during a period when access to the restricted environment is impeded;

means for recognizing the linguistic content of the one or more words when spoken by an individual seeking access to the restricted environment;

means for comparing the acquired representation only against the facial representations of individuals with whom the one or more words are associated; and means for denying intial access to the restricted environment if the comparsion indicates that the individual seeking initial access is not an authorized individual.

* * * * *

UNITED STATES PATENT AND TRADEMARK OFFICE
CERTIFICATE OF CORRECTION

PATENT NO. : 6,111,517

DATED : August 29, 2000

INVENTOR(S) : Atick et al.

It is certified that errors appear in the above-identified patent and that said Letters Patent is hereby corrected as shown below:

<u>after the Title of the Invention but before the Copyright Authorization:</u> insert — This application contains a microfiche appendix. The microfiche appendix includes 22 microfiche and 2070 frames. —

Signed and Sealed this

Fifteenth Day of May, 2001

*Attest:*

NICHOLAS P. GODICI

*Attesting Officer*  Acting Director of the United States Patent and Trademark Office

UNITED STATES PATENT AND TRADEMARK OFFICE
CERTIFICATE OF CORRECTION

PATENT NO. : 6,111,517
DATED : August 29, 2000
INVENTOR(S) : Joseph J. Atick, Paul A. Griffin and A. Norman Redlich It is certified that error appears in the above-identified patent and that said Letters Patent is hereby corrected as shown below:

Column 1,
Line 4, insert -- GOVERNMENT INTEREST: This invention was made with Government support under N00014-95-1-0381 awarded by the Office of Naval Research. The Government has certain rights in the invention. --

Signed and Sealed this

Twenty-sixth Day of July, 2005

JON W. DUDAS
*Director of the United States Patent and Trademark Office*